United States Patent
Ramalingam

(10) Patent No.: US 9,760,281 B2
(45) Date of Patent: Sep. 12, 2017

(54) SEQUENTIAL WRITE STREAM MANAGEMENT

(71) Applicant: INTEL CORPORATION, Santa Clara, CA (US)

(72) Inventor: Anand S. Ramalingam, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 70 days.

(21) Appl. No.: 14/671,968

(22) Filed: Mar. 27, 2015

(65) Prior Publication Data
US 2016/0283116 A1    Sep. 29, 2016

(51) Int. Cl.
*G06F 13/00* (2006.01)
*G06F 3/06* (2006.01)
*G06F 12/0895* (2016.01)

(52) U.S. Cl.
CPC .......... *G06F 3/0602* (2013.01); *G06F 3/0629* (2013.01); *G06F 3/0679* (2013.01); *G06F 12/0895* (2013.01); *G06F 2212/202* (2013.01); *G06F 2212/60* (2013.01)

(58) Field of Classification Search
CPC ........... G06F 9/4887; G06F 17/30; G06F 3/00
See application file for complete search history.

(56) References Cited

U.S. PATENT DOCUMENTS

| 8,874,836 B1 | 10/2014 | Hayes et al. | |
| 2004/0194095 A1* | 9/2004 | Lumb ................... | G06F 9/4887 718/100 |
| 2010/0198920 A1 | 8/2010 | Wong et al. | |
| 2011/0320733 A1 | 12/2011 | Sanford et al. | |
| 2012/0110291 A1 | 5/2012 | Zilber et al. | |
| 2014/0201429 A1* | 7/2014 | Tal ....................... | G06F 12/0246 711/103 |
| 2014/0365725 A1 | 12/2014 | Barrell et al. | |
| 2015/0161039 A1* | 6/2015 | Yeh ...................... | G06F 12/0246 711/103 |
| 2016/0147671 A1* | 5/2016 | Vishne .................... | G06F 12/12 711/135 |

OTHER PUBLICATIONS

International Search Report and Written Opinion for International Application No. PCT/US2016/018795, dated Jun. 3, 2016, 9 pages. [77.313PCT (ISR & WO)].

(Continued)

*Primary Examiner* — Charles Rones
*Assistant Examiner* — Han Doan
(74) *Attorney, Agent, or Firm* — Konrad Raynes Davda & Victor LLP

(57) ABSTRACT

In one embodiment, sequential write stream management is employed to improve the sequential nature of write data placed in a storage such as a solid state drive, notwithstanding intermingling of write commands from various sequential and nonsequential streams from multiple processor nodes in a system. In one embodiment, write data from an identified sequential write stream is placed in a storage area assigned to that particular identified sequential write stream. In another aspect, detected sequential write streams are identified as a function of write velocity of the detected stream. Other aspects are described herein.

21 Claims, 8 Drawing Sheets

(56) References Cited

OTHER PUBLICATIONS

Samsung Electronics Co., "Industry's First NVMe Solid State Drive", Samsung Ultra-Fast Enterprise Class 1.6TB SSD (XS1715), Product Overview, © 2014, 2 pp.
Samsung Electronics Co, "Understanding SSDs: A Peek Behind the Curtain", [online], [Retrieved on Mar. 3, 2015], Retrieved from the Internet at <URL: http://www.samsung.com/global/business/semi-conductor/minisite/SSD/us/download/04_Understanding_SSDs.pdf>, 3 pp.
U.S. Appl. No. 14/573,517, filed Dec. 17, 2014, entitled "Reduction of Intermingling of Input and Output Operations in Solid State Drives", by G.F. Paes, et al., 36 pp. [77.308 (Appln)].
Wikipedia, "Write Amplification", [online], last modified Feb. 7, 2015, [retrieved on Mar. 3, 2015], retrieved from the Internet at <URL: http://en.wikipedia.org/wiki/Write_amplification>, 14 pp.

\* cited by examiner

SEQUENTIAL WRITE STREAM MANAGEMENT

TECHNICAL FIELD

Certain embodiments of the present invention relate generally to storage in which write data for a sequential write stream is stored.

BACKGROUND

A computing system may have one or more processor nodes in which each node has a processing resource provided by one or more central processing units, microprocessors, cores of a microprocessor or a shared processing resource of a virtual machine (VM) which is an emulation of a particular computing system. The processor nodes of the computing system may share resources such as storage, for example. In one type of storage referred to as block storage, data is accepted in multiples such as a 512 byte multiple, for example. For a shared storage, each processor node may have one or more storage command submission queues to provide read commands, write commands and other storage commands from the processor nodes to the shared storage.

In some shared storage designs, the shared storage has a controller which receives the storage commands issued by each of the storage command submission queues of the various processor nodes and consolidates the storage commands in a common pending storage command queue to await execution by the shared storage. To distribute access to the shared storage amongst the processor nodes, the block storage controller may utilize an access distribution process such as a "round robin" distribution process, for example. In such an access distribution process, the block storage controller accepts a storage command from one command submission queue and places it in the common pending storage command queue in one turn, accepts a storage command from the next command submission queue and places it in the common pending storage command queue in the next turn, and so on. As a result of the shared storage access distribution process, the storage commands issued by a particular command submission queue of a particular processor node, may become intermingled with the storage commands issued by other storage command submission queues of the same or other processor nodes.

One example of block storage which is often shared by one or more processor nodes is a solid state drive (SSD). An SSD is a data storage device that uses integrated circuit assemblies as nonvolatile storage to store data persistently. SSDs typically have no moving mechanical components and this distinguishes SSDs from traditional electromechanical magnetic disks, such as, hard disk drives (HDDs) or floppy disks, which contain spinning disks and movable read/write heads. Compared to electromechanical disks, SSDs are typically more resistant to physical shock, run silently, have lower access time, and less latency. Many type of SSDs use NAND-based flash memory cells which retains data without power and is a type of non-volatile storage technology.

A block storage controller of the SSD may write write data in response to the write commands into one or more bands of storage in the shared storage. Within a band of storage, the SSD block storage controller frequently operates on entire blocks of storage at a time. For example, before writing to a memory cell within a block of memory cells in an SSD, the entire block of storage is usually erased at one time, typically by the application of a large voltage to the memory cells of the block of memory cells at a time. However, before erasing a block of data containing data to be preserved, the data which is to remain unchanged, is usually read out and saved. Once the erasure is completed, the new data and the saved data are both written to the newly erased block or in some cases to a previously erased block.

As a consequence, to write new data into an SSD, the quantity of data actually written to achieve the writing of the new data may in many cases exceed the quantity of new data. This phenomenon is sometimes referred to as "write amplification" and may adversely affect SSD performance.

BRIEF DESCRIPTION OF THE DRAWINGS

Embodiments of the present disclosure are illustrated by way of example, and not by way of limitation, in the figures of the accompanying drawings in which like reference numerals refer to similar elements.

DESCRIPTION OF EMBODIMENTS

Figure 1:
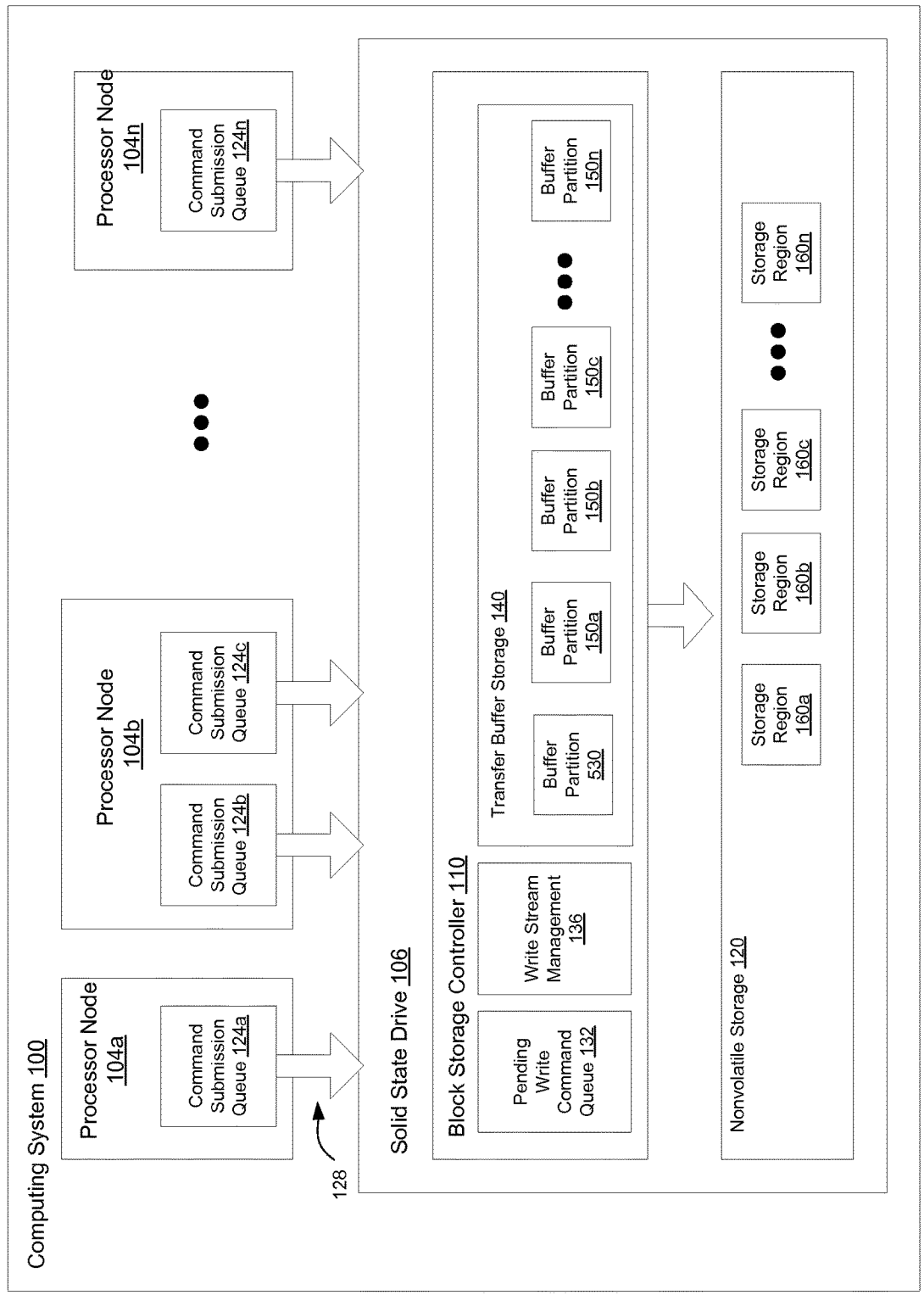
FIG. 1 depicts a high-level block diagram illustrating selected aspects of a computing system, employing sequential write stream management in accordance with an embodiment of the present disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

One embodiment of the present description is directed to a computing system in which a plurality of write commands from various command submission queues are queued in a common command queue and executed from the common command queue. In one aspect of the present description, sequential write streams within the queued write commands are detected and identified as particular sequential write streams. Thus, the identified sequential write streams may be assigned different identification (ID) names or numbers, for example and may be assigned to particular storage areas or regions as a function of the assigned sequential write stream identification.

In one embodiment, a transfer buffer storage is provided to temporarily store data prior to writing the data to the storage. Write data of commands being executed may be written into different sequential write stream buffer partitions of such a transfer buffer storage as a function of the identification of the sequential write streams. For example, the write data of one identified sequential write stream may be aggregated in one sequential write stream buffer partition of the transfer buffer storage, and write data of another identified sequential write stream may be aggregated in a different sequential write stream buffer partition of the transfer buffer storage. As explained in greater detail below, such write data partitioning in a transfer buffer as a function of sequential write stream identification may reduce write amplification in a solid state storage device.

In another aspect of the present description, write data of commands being executed is written into different sequential write stream storage areas or regions of a solid-state storage as a function of the identified sequential write streams. For example, the write data of one identified sequential write stream may be aggregated in one sequential write stream storage region of the solid-state storage, and the write data of another identified sequential write stream may be aggregated in a different sequential write stream storage region of the solid-state storage. As explained in greater detail below, such write data aggregating in different segregated sequential write stream storage regions as a function of sequential write stream identification may also reduce write amplification in a solid state storage device.

In another aspect of the present description, detected sequential write streams may be identified as particular sequential write streams as a function of various characteristics of the detected sequential write streams. In one embodiment, one such characteristic of a write stream is referred to herein as "write velocity" which is a measure of the rate at which the sequential write stream is updated or overwritten in storage. In one example, a sequential write stream may be modeled as a circular buffer in which data writes wrap around or loop back over the circular buffer. A smaller circular buffer with a lower rate of data updates may have the same write velocity as a larger circular buffer with a higher rate of data updates if the two circular buffers wrap around or loop back at the same rate.

In one embodiment, a write velocity characteristic for a detected sequential write stream may be detected, and the identification assigned to that detected sequential write stream may be a function of the detected write velocity for the detected sequential write stream. Thus, in one example, two different detected sequential write streams having the same or similar write velocity characteristics (e.g. within the same range) may be assigned the same sequential write stream identification. It is appreciated that write velocity detection in accordance with the present description may be applied to other data writing embodiments having other measures of data update rates.

In one embodiment, the write data for two different detected sequential write streams having the same or similar write velocity characteristics and the same assigned sequential write stream identification, may be written to a common stream velocity storage region which may contain one or more sequential write stream storage areas for the different detected sequential write streams As a result, different sequential stream storage areas of the solid-state storage may be aggregated in a common stream velocity storage region where the write velocities of the detected sequential write streams assigned to the storage areas within the common storage region have been determined to be the same or similar. As explained in greater detail below, such write data aggregating of different detected sequential write steams having the same or similar write velocities in a common stream velocity storage region, may also reduce write amplification in a solid state storage device.

It is appreciated that in other embodiments, detected sequential write streams may be identified as a function of characteristics other than write velocity. Hence, some detected sequential write streams may be assigned sequential write stream identifications as a function of characteristics in addition to or instead of a write velocity characteristic, for example.

FIG. 1 illustrates a block diagram of a computing system 100 employing sequential write stream management in accordance with one embodiment of the present description. In this embodiment, the computing system 100 includes a plurality of processor nodes 104*a*, 104*b*, . . . 104*n* which share access to a solid state drive 106. Each processor node may have one or more central processing units (CPUs), microprocessors, processing cores, virtual machines or other processing resources. The processor nodes 104*a*, 104*b* . . . 104*n* and the solid state drive 106 may be fabricated as a single component such as a system on a chip (SoC), or may be fabricated as separate components coupled together in a semiconductor package or on one or more circuit boards, or in a device housing or may be otherwise electrically coupled together.

The solid state drive 106 may be comprised of a block storage controller 110 and a non-volatile storage 120, such as NAND storage, NOR storage or some other suitable non-volatile storage. The block storage controller 110 and non-volatile storage 120 may, like the computing system 100, be fabricated as a single component such as a system on a chip (SoC), or may be fabricated as separate components coupled together in a semiconductor package or on one or more circuit boards, or in a device housing or otherwise electrically coupled together.

In certain embodiments, the solid state drive 106 may be capable of storing several terabytes of data or more, or less, depending upon the particular application. Certain embodiments may be applied to other types of non-volatile storage or memory, phase change memory (PCM), a three dimensional cross point memory, a resistive memory, nanowire memory, ferro-electric transistor random access memory (FeTRAM), magnetoresistive random access memory (MRAM) memory that incorporates memristor technology, spin transfer torque (STT)-MRAM, byte addressable random access non-volatile memory, etc.

In certain embodiments, the computing system 100 may comprise any suitable computational device, such as a personal computer, a mainframe, a telephony device, a smart phone, a storage controller, a blade computer, a processor with storage, etc. Each processor node 104*a*, 104*b* . . . 104*n* of the computing system 100 has one or more storage command submission queues 124*a*, 124*b* . . . 124*n* for read, write or other storage commands to be issued by the associated processor node to the SSD 106 over one or more communication links or busses such as a Peripheral Component Interconnect (PCIe) links, for example. A processor node such as the processor node 104*b* may have more than one submission queue as represented by the queues 124*b*, 124*c*. Other types of communication links or busses include Serial Advanced Technology Attachment (SATA), Serial Attached Small Computer System Interface (SAS)) bus or a network, such as the Internet, a storage area network (SAN), a local area network (LAN), etc. Further details of the SATA specification may be found in the publication titled "Serial ATA Specification, Revision 3.2," released August 2013, by SATA International Organization (SATA-IO), Beaverton, Oreg. In another example, the interface and/or interconnect protocol may comply and/or be compatible with a NVMe (Non-Volatile Memory Host Controller Interface Express). Further details of NVMe may be found in the publication titled "NVM Express™, Revision 1.2," released Nov. 3, 2014 by NVM Express™ Work Group, and/or earlier and/or later versions of this specification (NVM Express is a trademark of NVM Express, Inc.). It is appreciated that embodiments employing standards such as SATA and SAS standards may not have a plurality of command interface or other submission queues. However, sequential write stream management in accordance with the present description may also be applied to such embodiments, particularly in such embodiments employing multiple virtual machines sharing a block storage, for example, in which storage operations become intermingled.

Figure 2:
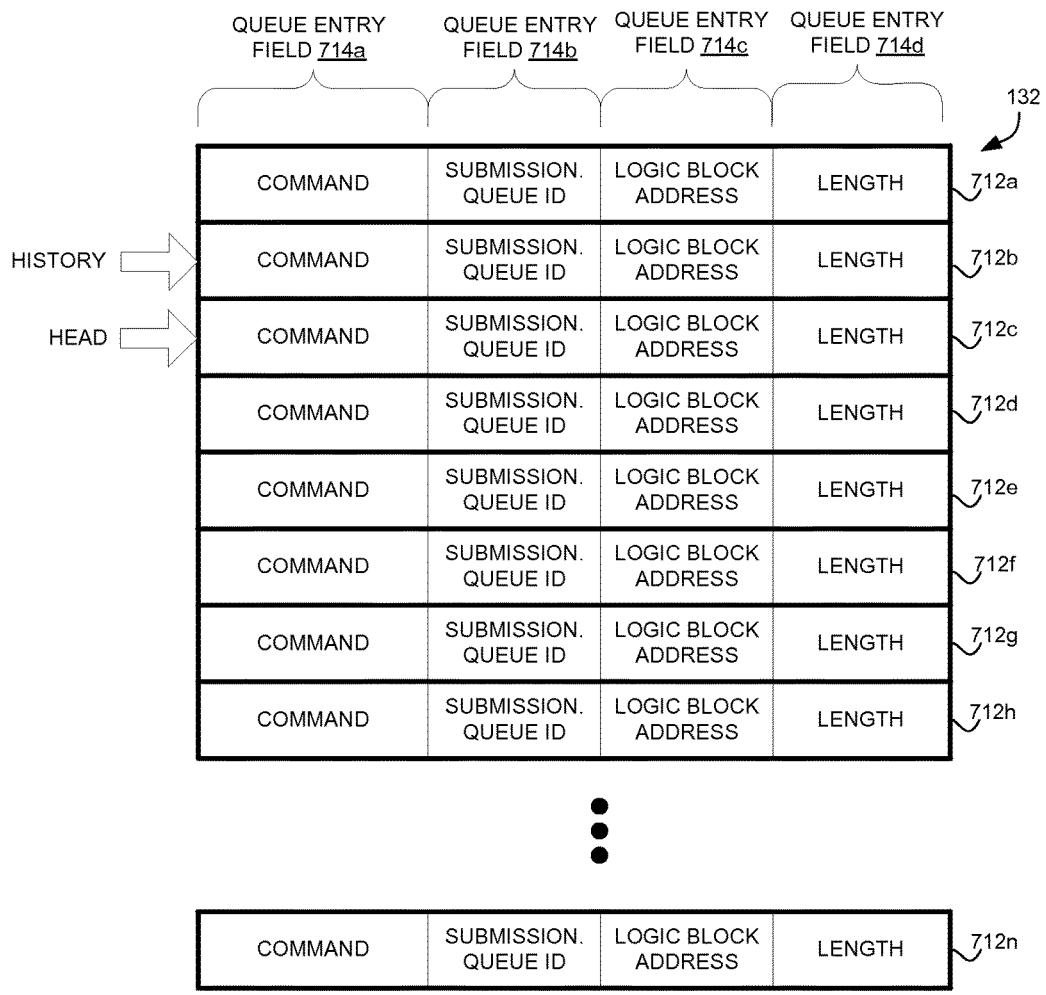
FIG. 2 depicts an example of a storage queue for queuing storage commands received from multiple submission queues of the computing system of FIG. 1.

The streams of write storage commands received by the block storage controller 110 from the various storage command submission queues 124a, 124b . . . 124n of the processor nodes 104a, 104b . . . 104n are queued in one or more common queues which in this embodiment, is a pending write command queue 132, an example of which is depicted schematically in FIG. 2. In accordance with one aspect of the present description, the block storage controller 110 includes write stream management logic 136 which utilizes data obtained from the pending write command queue 132, to control the placement of write data in one or more areas of a transfer buffer 140 and the nonvolatile storage 120 in such a manner as to facilitate more efficient data write operations. For example, the transfer buffer 140 of this embodiment includes sequential stream buffer partitions 150a, 150b, 150c . . . 150n, each of which may be assigned to one or more identified sequential write streams for purposes of aggregating the write data of the assigned sequential write stream or streams. Similarly, the nonvolatile storage 120 includes storage regions 160a, 160b, 160c . . . 160n, each of which may be assigned to one or more identified sequential write stream for purposes of aggregating the write data of the assigned sequential write stream or streams. The write stream management logic 136 may be located within the block storage controller 110, the nonvolatile storage 120, one or more processor nodes 104a-104n or any other component of the computing system 100, and may be implemented in hardware, software, firmware or any combination thereof, to improve data write operations.

For example, it is recognized that many systems utilizing multiple submission queues to send streams of commands directly from CPU cores or other processing nodes to a shared SSD, typically do not serialize or otherwise coordinate the sending of storage commands from the various CPU cores. As a result, a sequential write stream of write commands to logically contiguous areas of storage from one CPU core, may end up intermingled at the block storage controller interface of the solid state drive 106, with storage commands from other CPU cores of the system. As a result, absent write stream management logic 136 in accordance with the present description, in prior systems, the data written to the SSD from the combined streams of commands may lose the sequential nature of any original sequential write streams. The degree of loss of the sequential nature of an original sequential write streams may be worsened the deeper the commands are queued in the various submission queues. As a result, absent write stream management logic 136 in accordance with the present description, sequential write performance of the SSD may degrade as the queue depth and command intermingling from the different streams increase. It is noted that even when operating in a single threaded scenario, because operating systems tend to wake a particular thread on a different hyper threaded CPU core, the command stream of the thread may shift to a different command submission queue thereby resulting in further intermingling of commands.

Figure 3:
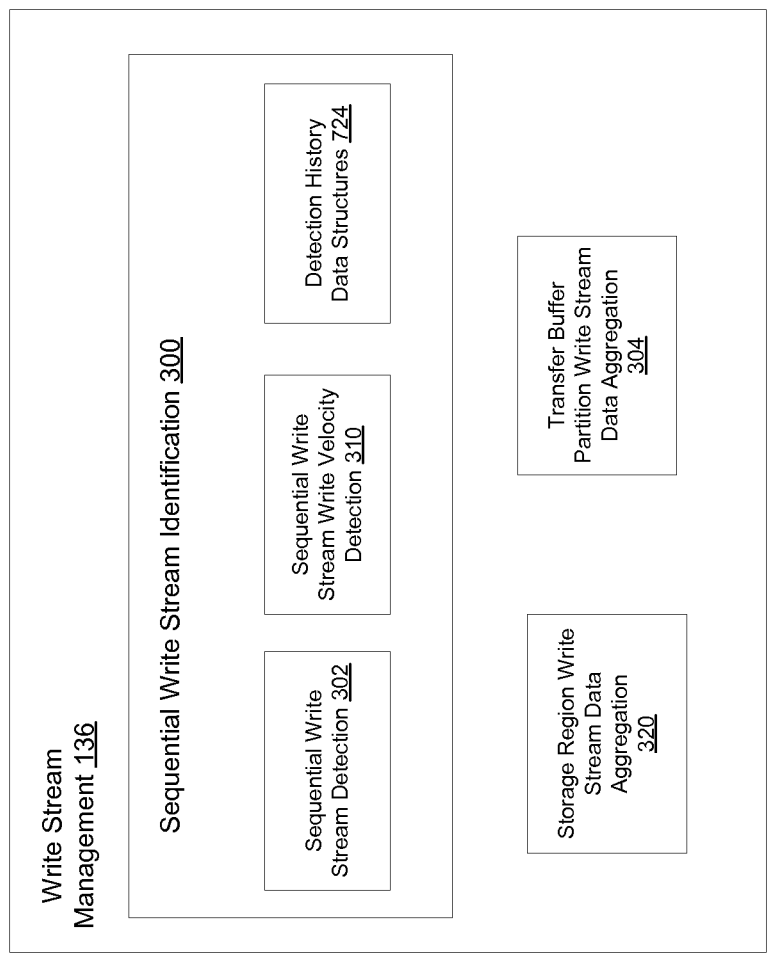
FIG. 3 shows a schematic diagram of an example of write stream management logic for the computing system of FIG. 1, employing sequential write stream management in accordance with an embodiment of the present disclosure.

FIG. 3 depicts one example of write stream management logic 136 in accordance with the present description. In this embodiment, a sequential write stream identification logic 300 of the write stream management logic 136, employs heuristics in a sequential write stream detection logic 302 to detect the presence of sequential write streams in the write commands received by the SSD 106. For each detected sequential write stream, the write velocity of the sequential write stream is detected by sequential write stream write velocity detection logic 310 in one embodiment. As previously mentioned, as used herein, the term "write velocity" refers to the rate at which data is updated by a host application. It is appreciated that in some embodiments, write velocity detection may be omitted for detected sequential write streams.

In one embodiment, the identity assigned to a detected sequential write stream is a function of characteristics of the detected sequential write stream. In one embodiment, the identity assigned to a detected sequential write stream is a function of the write velocity characteristic detected for the particular detected sequential write stream. For detected sequential write streams having a common or similar write velocity, those sequential write streams may be assigned a common or a related sequential write stream identification name or number by the sequential write stream identification logic 300. Thus, in one embodiment, a particular identified sequential write stream may be a combination of one or more detected sequential write streams having a common or similar write velocity, for example. In other embodiments, each detected sequential write stream may be assigned a unique sequential write stream identification. In another embodiment, detected write streams having a common or similar write velocity may be indicated in a data structure which indicates groupings of sequential write stream identifications in which each sequential write stream of the group has the same or similar write velocity. It is anticipated that sequential write stream identifications may be assigned in a variety of techniques, depending upon the particular application. For example, detected sequential write streams may be identified as a function of a write stream characteristic other than or in addition to write velocity such as the Logical Block Addressing (LBA) write stream destination, the submission queue source of the sequential write stream or other characteristics, depending upon the particular application.

Upon identifying a sequential write stream, the write data for that particular identified sequential write stream may be aggregated in a storage area segregated for that identified sequential write stream. For example, the write data for an identified sequential write stream may be aggregated by a transfer buffer partition write stream data aggregation logic 304 in a particular sequential write stream transfer buffer partition 150a, 150b, . . . 150n (FIG. 1) assigned to the identified sequential write stream. As explained in greater detail below, it is believed that such aggregation of write data by identified sequential write stream to internally reassemble the write data of the identified sequential write stream in an assigned sequential write stream transfer buffer partition may improve write performance of the SSD 106. For example, it is believed that the sequential nature of the write data of an identified sequential write stream may be restored to a degree by the aggregation of the write data of the identified sequential write stream in an assigned sequential stream transfer buffer partition, notwithstanding the intermingling of the write commands from the various command submission queues in a common pending write queue of the block storage controller.

The write data for one or more identified sequential write streams may also be aggregated by storage region write velocity data aggregation logic 320, in a particular nonvolatile storage region 160a, 160b, . . . 160n (FIG. 1) assigned to each identified sequential write streams. In one embodiment, the detected sequential write stream or streams of the identified sequential write stream assigned to a particular storage region have the same or similar write velocity. As explained in greater detail below, it is believed that such aggregation of write data by detected sequential write streams having the same or similar write velocity, to internally reassemble the write data of the detected sequential write streams in an assigned nonvolatile storage region 160a, 160b, . . . 160n (FIG. 1) may also improve write performance of the SSD 106. For example, it is believed that by aggregating the write data in a storage region assigned to detected sequential write streams having the same or similar write velocity, the aggregated write data of the identified sequential write stream of the region may be updated at the same or similar time, thereby facilitating garbage collection and reducing data relocation and write amplification.

As previously mentioned, in some embodiments, detected sequential write streams may be assigned sequential write stream identifications as a function of characteristics in addition to or instead of a write velocity characteristic, for example. Accordingly, it is appreciated that in storage regions storing sequential write streams in which the write velocities are not equal due to various factors, the fact that sequential write streams are stored adjacent within the region may facilitate bulk invalidation of data when it time to erase the data, notwithstanding the different write velocities. As a result, write amplification may be improved.

In yet another aspect of the present description, the storage region write stream data aggregation logic 320 which aggregates the write data by identified sequential write stream in an assigned nonvolatile storage region 160a, 160b, . . . 160n (FIG. 1), may further reorder and pack the write data of the identified sequential write stream in different storage areas within a storage region 160a, 160b, . . . 160n (FIG. 1) as a function of various characteristics of the detected sequential write streams identified by a common sequential write stream identification.

Figure 4:
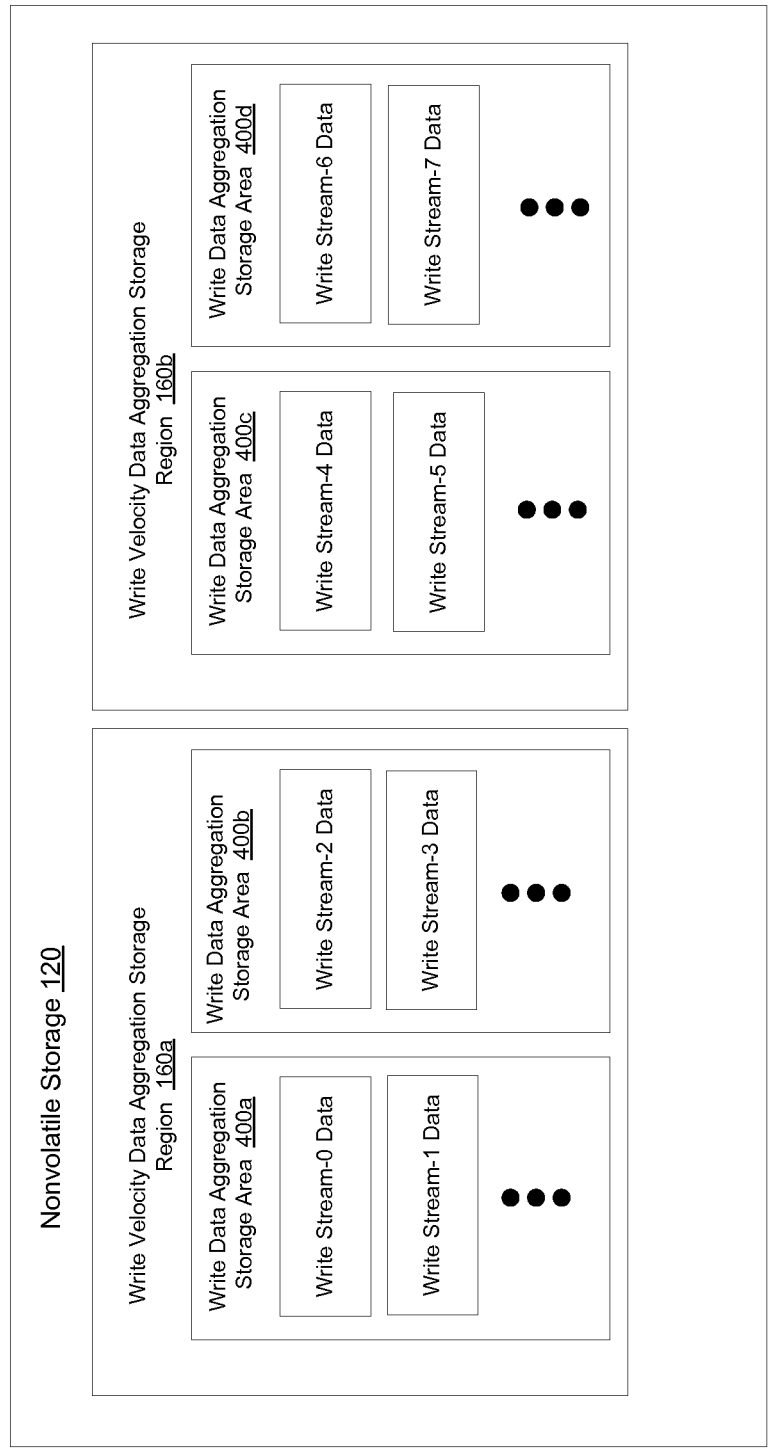
FIG. 4 depicts storage regions of a storage of a solid state drive for the computing system of FIG. 1, employing sequential write stream management in accordance with an embodiment of the present disclosure.

For example, FIG. 4 shows a write velocity data aggregation storage region 160a which includes a plurality of storage areas as represented by the write data aggregation storage area 400a and the write data aggregation storage area 400b. The write velocity data aggregation storage region 160a may be assigned to receive the write data of the identified sequential stream stream_ID0, for example. Similarly, a write velocity data aggregation storage region 160b includes a plurality of storage areas as represented by the write data aggregation storage area 400c and the write data aggregation storage area 400d. The write velocity data aggregation storage region 160b may be assigned to receive the write data of the identified sequential stream stream_ID1, for example.

In one example, detected sequential write streams stream-0, stream-1, stream-2, stream-3, have the same sequential write stream identification stream_ID0, for example, and have write data within a particular range of detected write velocities. Accordingly, the write data of the detected sequential write streams stream-0, stream-1, stream-2, stream-3, are aggregated in the same write velocity data aggregation storage region 160a, for example. However, within the aggregated write data of storage region 160a, the write data of the detected sequential write streams detected sequential write streams stream-0, stream-1, stream-2, stream-3, identified by the sequential write stream identification stream_ID0, may be sequentially reordered and packed contiguously in one or more of the storage areas 400a, 400b of the write velocity data aggregation storage region 160a, as a function of various characteristics of the detected sequential write streams of the identified sequential write stream. Thus in this example, the write data of the detected sequential write streams stream-0, stream-1, identified by the sequential write stream identification stream_ID0, may be reordered and packed contiguously in the storage area 400a, for example, of the write velocity data aggregation storage region 160a. Similarly, the write data of the detected sequential write streams stream-2, stream-3, also identified by the sequential write stream identification stream_ID0, may be reordered and packed contiguously in the storage area 400b, for example, of the write velocity data aggregation storage region 160a.

It is believed that sequentially repacking sequential write data within a sequential write stream having an identified velocity stream facilitates in garbage collection. Accordingly, even if the write velocity of one or more of the detected sequential write streams was detected incorrectly, it is believed that garbage collection is facilitated. For example, if data is to be read from a block within the storage region prior to erasing the block, the reading of sequential content may be substantially faster and more efficient as compared to random content. In some embodiments, such reading of sequentially ordered data may be four to sixteen times faster, depending upon the particular application. For example, bottlenecks incurred by system on a chip (SoC) channels may dilute the gain achieved by sequentially ordering the data.

In one embodiment, a storage area 400a, for example, of the storage region 160a may be assigned to store the reordered and contiguous write data of a detected sequential write stream write such as write stream stream-0, for example, as a function of various characteristics of the particular detected write stream such as, for example, the write data destination addresses of the write stream stream-0 as indicated by Logical Block Addressing (LBA) for example, or as a function of the submission queue from which the write commands for that write data stream originated. Here too, it is believed that the sequential nature of the write data of detected sequential write streams may be restored to a degree by the aggregation of the write data of the detected sequential write stream in an assigned sequential stream storage area, notwithstanding the intermingling of the write commands from the various command submission queues, within a common command queue of the block storage controller. The write data of the detected sequential write streams stream-4, stream-5, stream-6, stream-7, identified by the sequential write stream identification stream_ID1, may be similarly reordered and packed contiguously in the storage areas 400c, 400d as shown for the write velocity data aggregation storage region 160b, as a function of the characteristics of the detected sequential write streams.

As previously mentioned, the write stream management logic 136 may be located within the block storage controller 110, the nonvolatile storage 120, one or more processor nodes 104a-104n or any other component of the computing system 100, and may be implemented in hardware, software, firmware or any combination thereof, to improve data write operations. However, it is appreciated that in some embodiments, placing primary components of the write stream management logic 136 within the SSD 106 may provide enhancements as compared to, for example, software operating primarily in a processor node of the processor nodes 104a-104n. For example, host software which arranges write commands in a serial and sequential manner in a single submission queue to avoid intermingling of sequential write streams and random write operations may impact input/output operations as compared to the write stream management logic 136 within the SSD 106. Moreover, such host level command reordering may adversely affect mutually exclusive event (mutex) handling, cache coherence and deferred procedure calls for the other processor nodes.

In one shared storage design, the block storage controller may reserve one or more "bands" of storage space within the shared storage, in which each reserved band is assigned to a particular processor node such as a virtual machine. Thus, write data written to a particular reserved storage band, may be limited to the particular virtual machine assigned to that reserved storage band to the exclusion of the write data issued by other virtual machines writing data to the shared storage.

By comparison, in sequential write stream management in accordance with one embodiment of the present description, write data written to a particular storage area such as a storage band may be reserved as a function of identified sequential write streams rather than simply the processor identity of the source of the write commands. The write data of an identified sequential write stream may be extracted from a stream of write commands in which sequential and random write commands have been intermingled, for example, or from a stream in which the write commands of sequential write streams having different write velocities have been intermingled, for example.

The extracted write data of an identified sequential stream may be aggregated in a storage area or region assigned to that identified sequential stream notwithstanding that the write commands of the identified sequential write stream may have originated from more than one processor node. However, it is appreciated that in some embodiments, processor identity or submission queue identity of the source of the write commands may also be used in conjunction with other characteristics of detected sequential write streams to aggregate the write data of the identified sequential write stream in a storage area reserved for that detected sequential write stream or other detected sequential write streams having similar characteristics.

Figure 5:
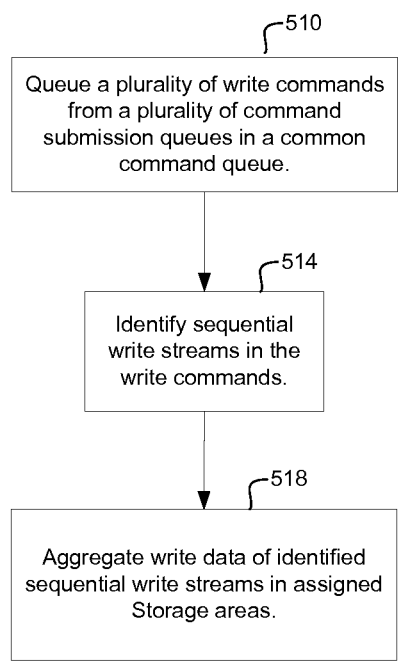
FIGS. 5-6 depict an examples of operations for sequential write stream management in accordance with an embodiment of the present disclosure.

FIG. 5 depicts one example of operations of a computing system employing sequential write stream management in accordance with the present description. In one operation, write commands from a plurality of different command submission queues, such as the command submission queues 124a, 124b . . . 124n (FIG. 1), for example, are queued (block 510, FIG. 5) in a common queue which may intermingle the various write commands in the common queue such as the pending write command queue 132 (FIG. 1) of the block storage controller 110, for example. Sequential write streams within the write commands are identified (block 514) by appropriate logic such as the sequential write stream identification logic 300 of the write stream management logic 136 of FIG. 3, for example.

For an identified sequential write stream, the write data of that identified write stream is extracted and aggregated (block 518) in a storage area or region assigned to that identified sequential write stream. In one embodiment, the write data of the identified sequential write stream may be extracted and aggregated by logic such as the transfer buffer partition write stream data aggregation logic 304 of the write stream management logic 136 of FIG. 3, for example. As previously mentioned, the transfer buffer partition write stream data aggregation logic 304 can aggregate the write data of an identified sequential write stream in a storage area such as a particular sequential stream transfer buffer partition 150a, 150b, . . . 150n (FIG. 1) assigned to the identified sequential write stream.

In one embodiment, the write data of an identified sequential write stream is aggregated as one or more pages of write data, within the particular sequential stream transfer buffer partition 150a, 150b, . . . 150n assigned to that identified sequential write stream. Once aggregated and buffered in the assigned sequential stream transfer buffer partition 150a, 150b, . . . 150n, the aggregated write data of the sequential write stream is written as one or more pages of write data to a particular storage area or region within the nonvolatile storage 120 assigned to that identified sequential write stream, such as a nonvolatile storage region 160a, 160b, . . . 160n (FIGS. 1, 4). It is appreciated that the granularity at which write data is aggregated and buffered in the transfer buffer storage 140 and the nonvolatile storage 120, may vary, depending upon the particular application.

In one aspect of the present description, the number of sequential stream transfer buffer partitions 150a, 150b, . . . 150n may be limited in number as a function of various factors such as the size of the transfer buffer storage 140, the size of the input/output workload and other factors, depending upon the particular application. Thus, in one example, in a transfer buffer storage of 1 MB (megabytes) in size, for example, a range of transfer buffer storage space such as 120-720 KB (kilobytes) may be allocated for buffering write data from sequential write streams which have been identified. Accordingly in an example in which three sequential write streams have been identified, such as sequential write streams stream_ID0, stream_ID1, stream_ID2, a 720 KB transfer buffer space may be partitioned into three sequential stream transfer buffer partitions 150a, 150b, 150c, for example, for the extracted and aggregated write data of three identified sequential write streams, stream_ID0, stream_ID1, stream_ID2, respectively.

In one embodiment, the three sequential stream transfer buffer partitions 150a, 150b, 150c may be fixed in size. In another embodiment, the sizes of the sequential stream transfer buffer partitions 150a, 150b, 150c may vary depending the size of the assigned identified sequential write streams and the number of other identified sequential write streams.

The remaining transfer buffer space represented as a buffer partition 530 (FIG. 1) is 1000 KB minus 720 KB or 280 KB in size in this example, and may be unallocated space to buffer read data from the nonvolatile storage 120 or to buffer the remaining write data such as write data from write commands which are not identified as part of a sequential write stream. For example, write data to be buffered in the transfer buffer 140 in connection with random, non-sequential data writes, garbage collection, and other data relocations with the nonvolatile storage 120, may be buffered in the data buffer partition 530. It is appreciated that the number and size of partitions within the transfer buffer 140 may vary, depending upon the particular application.

In one embodiment, once the write data of a sequential write stream buffered in a sequential stream transfer buffer partition 150a, 150b, 150c has been transferred to the nonvolatile storage 120 (FIG. 1), the transfer buffer storage space of that particular sequential stream transfer buffer partition may be released and added to the unallocated space of the buffer partition 530. Upon identification of another sequential write stream, a portion of the unallocated partition 530 may be reallocated as a new sequential write stream partition and assigned to the newly identified sequential write stream. In another embodiment, once the write data of a sequential write stream buffered in a sequential stream transfer buffer partition 150a, 150b, 150c has been transferred to the nonvolatile storage 120 (FIG. 1), the storage space of that sequential stream transfer buffer partition may be reserved, to await assignment to another identified sequential write stream.

As previously mentioned, in one embodiment of the present description, the number of concurrent sequential stream transfer buffer partitions 150a, 150b, . . . 150n active at one time may be limited in number as a function of various factors such as the size of the transfer buffer storage 140, the size of the input/output workload and other factors, depending upon the particular application. Thus, the number of concurrent sequential stream transfer buffer partitions 150a, 150b, . . . 150n may be limited to a maximum such as three identified sequential write stream partitions, for example at one time.

In one embodiment, each of the three concurrent sequential stream transfer buffer partitions in this example, has one active identified sequential write stream assigned to it. Accordingly, if another active sequential write stream is identified beyond the maximum number of concurrently active identified sequential write streams (which is three such identified concurrently active sequential write streams in this example), a sequential stream transfer buffer partition would not be available for assignment to the additional identified sequential write stream.

In such a case, in accordance with another aspect of the present description, processing of the write data of an identified sequential write stream which exceeds a maximum number of concurrently active identified sequential write streams, may be suspended for a period of time. Upon completion of the transfer of write data from one of the existing sequential stream transfer buffer partitions, and the release of that storage space, a sequential stream transfer buffer partition may be allocated for the newly identified and previously suspended sequential write stream, and processing of the write data resumed for the newly identified sequential write stream. If upon expiration of the suspension period of time, a sequential stream transfer buffer partition has not been allocated and assigned to the newly identified sequential write stream, processing of the write data for that stream may be resumed and the processed write data buffered in the unallocated transfer buffer partition 530. It is recognized that sequential data buffered in the unallocated transfer buffer partition 530 may be intermingled with non-sequential data.

It is appreciated that in some embodiments, more than one identified sequential write stream may be assigned to a particular sequential stream transfer buffer partition. If so, the maximum number of concurrently active identified active sequential write streams which may be buffered in the sequential stream transfer buffer partitions may be correspondingly increased. As explained in greater detail below, the types of sequential write streams which may be buffered or otherwise stored in a common area region or partition may be a function of characteristics of the detected sequential write streams, in one embodiment.

It is appreciated that some embodiments may lack a transfer buffer storage such as the transfer buffer storage 140, or may lack partitions of the transfer buffer assigned to particular identified sequential write streams. Accordingly, in one embodiment, write data of an identified write stream may be extracted and aggregated (block 518) directly into a storage area or region of the nonvolatile storage, by logic such as the storage region write stream data aggregation logic 320 of the write stream management logic 136 of FIG. 3, for example. In this manner, aggregation of identified sequential stream write data in an assigned transfer buffer partition may be bypassed, and the write data extracted for identified sequential write streams may be aggregated and stored directly into assigned storage regions 160a, 160b or storage areas 400a, 400b as discussed above, without being first buffered in an assigned transfer buffer partition.

Figure 6:
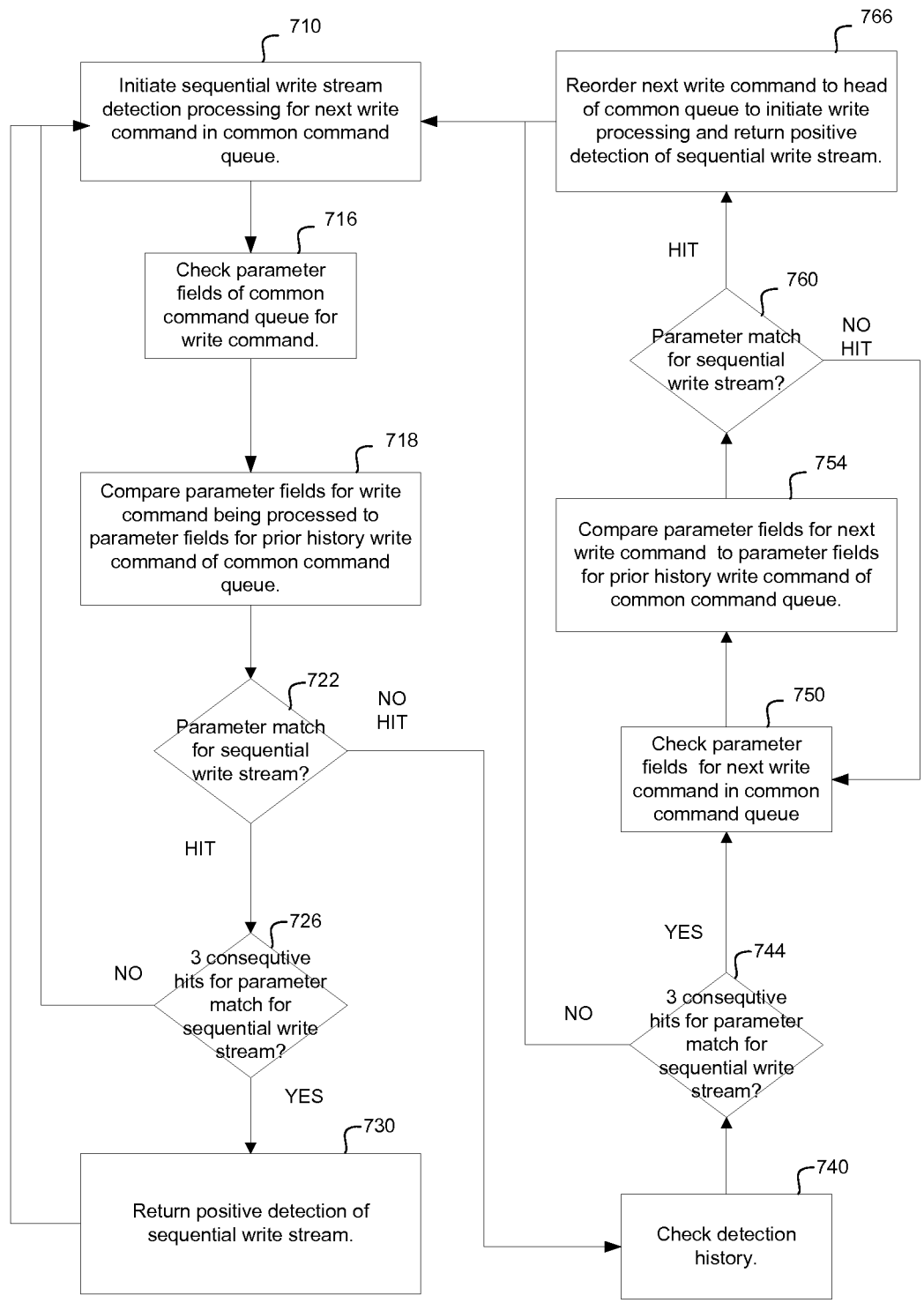

FIG. 6 shows an example of operations of the sequential write stream detection logic 302 of the sequential write stream identification logic 300 of the write stream management logic 136 of FIG. 3, for example. In one operation, sequential write stream detection processing is initiated (block 710) for a write command in a common command queue, such as the pending write command queue 132 (FIGS. 1, 2) of the block storage controller 110. As previously mentioned, the pending write command queue 132 is a queue of write commands awaiting write processing by the block storage controller 110, in which the write commands have been received from multiple submission queues 124a, 124, . . . 124n from multiple processor nodes 104a, 104b . . . 104n. As a result, write commands of sequential write streams are intermingled with write commands of other sequential write streams as well as random, nonsequential write commands.

As best seen in FIG. 2, the pending write command queue 132 has an entry for each write command of the queue 132 as represented by the entries 712a-712h. In this example, the next write command for which sequential write stream detection processing is initiated (block 710) is the write command of the entry 712c which is currently at the head of the queue as indicated by the "head" arrow. It is appreciated that the number of entries in the queue may vary, depending upon the particular application.

Each entry 712a-712h of the queue 132 has multiple queue entry fields as represented by the queue entry fields 714a-714d, for example. A first queue entry field 714a contains the write command itself of the entry awaiting write processing by the block storage controller 110 (FIG. 1). In this embodiment, the queue entry fields 714b-714d identify various parameters associated with the write command of the entry. Thus, a second queue entry field 714b identifies as a write command parameter, the particular submission queue from which the command of the entry was obtained. A third queue entry field 714c identifies the target or destination address of the write command of the entry. In the illustrated embodiment, the target address of the write command is provided in a Logical Block Addressing (LBA) format which is converted by the block storage controller 110 to physical addresses of the nonvolatile storage 120. A fourth queue entry field 714c identifies the length of storage space to be occupied by the write data of the write operation of the write command of the entry. The length may be expressed in terms of a range of LBA addresses, or a quantity of physical storage space such as bytes, pages, blocks etc.

Figure 7:
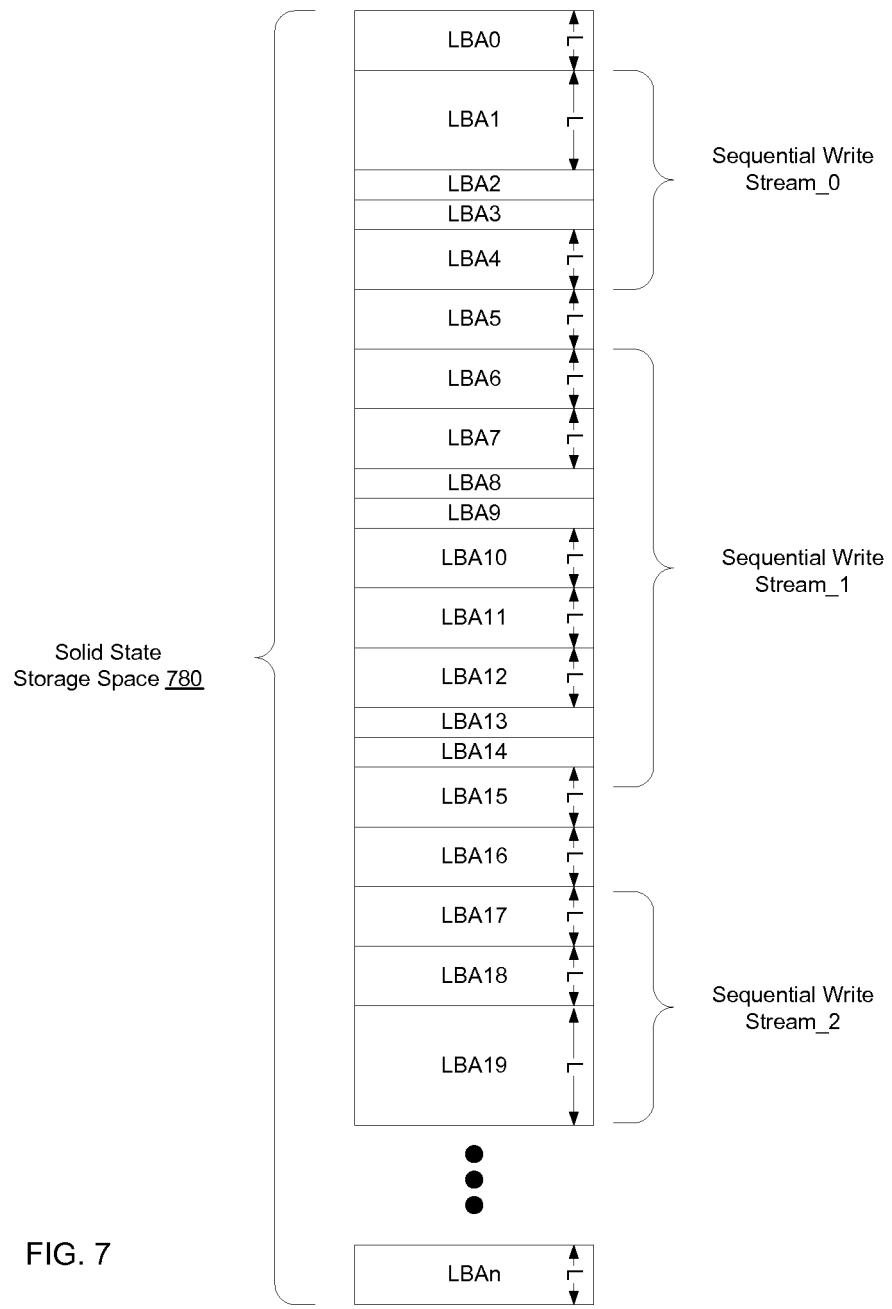
FIG. 7 depicts examples of sequential write streams detected by the write stream management logic of FIG. 3.

For example, FIG. 7 depicts a portion 780 of the storage space of the nonvolatile storage 120 represented by sequential, contiguous LBA ranges LBA0, LBA1 . . . LBAn in which the length or size L of each LBA range LBA0, LBA1 ... LBAn varies from range to range. In this example, the write data of a sequential write stream designated stream_0 when stored in the nonvolatile storage 120, will be written to a logically contiguous address space represented by the four sequential, contiguous LBA ranges LBA1, LBA2, LBA3 and LBA4. Because the four LBA ranges LBA1, LBA2, LBA3 and LBA4 are sequential and contiguous, the beginning LBA address of each LBA range follows consecutively from the ending LBA address of the prior LBA range. Thus, the beginning LBA address of the LBA range LBA2 follows consecutively from the ending LBA address of the prior LBA range which is LBA range LBA1 in this example. In a similar manner, the beginning LBA address of each LBA range of the other sequential write streams, stream_1, stream_2, follows consecutively from the ending LBA address of the prior LBA range of the sequence of LBA ranges of the particular sequential write stream.

Upon initiation (block 710) of sequential write stream detection processing for the write command of the entry 712c at the head of the queue 132, the write command parameters stored in the queue entry fields 714b-d of the head entry 712c may be checked (block 716) and compared (block 718) to the corresponding write command parameters stored in the queue entry fields 714b-d of the prior history entry which is entry 712b in this example, as indicated by the "history" arrow of FIG. 2. Thus, if the write command of the head entry 712c is the write command which writes the write data to write destination LBA range LBA2 of FIG. 7, and if the write command of the prior history entry 712b is the write command which writes its write data to write destination LBA range LBA1 of FIG. 7, the LBA and Length parameters of those two command entries will indicate a match, that is, that the beginning LBA address of the LBA range LBA2 defined by the queue entry fields 714c, 714d of the head entry 712c, follows consecutively from the ending LBA address of the prior LBA range which is LBA range LBA1 defined by the queue entry fields 714c, 714d of the prior history entry 712b. Thus, the parameters of the write commands of the head entry and the prior history entry indicate that the write commands of those two entries are likely write commands of a sequential write stream.

If the compared parameters match (block 722) those expected of two write commands of a sequence of write commands of a sequential write stream, a "hit" is recorded in a suitable data structure such as a data structure of the detection history data structures 724 of FIG. 3 If the "hit" recorded in connection with the operation of block 722 is determined (block 726) to be the third of three consecutive hits, a positive detection of a sequential write stream is returned (block 730) and recorded in the detection history data structures 724 (FIG. 3).

Once a sequential write stream has been detected, it is assigned a sequential stream identification by the sequential write stream identification logic 300 (FIG. 3). The particular sequential write stream identification assigned to a detected write stream may depend upon additional factors such as characteristics of the detected sequential write stream, such as the write velocity detected for the detected sequential write stream as explained in greater detail below.

In addition, write processing of the write command of entry 714c at the head of the queue may be initiated using the sequential stream identification as discussed herein. The head of the queue may be incremented to the next entry 714d and the history marker of the queue may be incremented to the next entry 714c. The sequential write stream detection processing may be initiated (block 710) for the next write command of entry 714d.

If the compared parameters do not match (block 722) those expected of two write commands of a sequence of write commands of a sequential write stream, indicating that the write command of the head entry 712c is likely not a write command of a sequential write stream, that is, a "no hit," the detection history recorded in the detection history data structures 724 (FIG. 3) may be checked (block 740) to determine (block 744) whether three consecutive hits for parameter match have previously been recorded indicating a prior detection of a sequential write stream. If so, the write command parameters stored in the queue entry fields 714b-d of the write command of the next entry 712d after the head entry 712c of the queue 132, may be checked (block 750) and compared (block 754) to the corresponding write command parameters stored in the queue entry fields 714b-d of the prior history entry which is entry 712b in this example. Thus, if the write command of the next entry 712d is the write command which writes the write data to write destination LBA range LBA2 of FIG. 7, and if the write command of the prior history entry 712b is the write command which writes its write data to write destination LBA range LBA1 of FIG. 7, the LBA and Length parameters of those two command entries will indicate a match, that is, that the beginning LBA address of the LBA range LBA2 defined by the queue entry fields 714c, 714d of the head entry 712c, follows consecutively from the ending LBA address of the prior LBA range which is LBA range LBA1 defined by the queue entry fields 714c, 714d of the prior history entry 712b. Thus, the parameters of the write commands of the next entry 712d and the prior history entry 712b indicate that the write commands of those two entries are likely write commands of a sequential write stream, and a sequential write stream "hit" is indicated (bloc 760).

If the compared parameters match (block 760) those expected of two write commands of a sequence of write commands of a sequential write stream, indicating a "hit", a positive detection of a sequential write stream is returned (block 766) and the common queue 132 is reordered so that the write command of the hit, which is the write command of entry 714d in this example, will be at the head of the queue so that write processing may be initiated for the write command of entry 714d as discussed above for the write command of entry 714c.

The return (block 766) of a positive detection of a sequential write stream is recorded in the detection history data structures 724. Once a sequential write stream has been detected, it is assigned a sequential stream identification by the sequential write stream identification logic 300 (FIG. 3) for write processing as discussed above.

If the compared parameters do not match (block 760) those expected of two write commands of a sequence of write commands of a sequential write stream, indicating that the write command of the next entry 712d is likely not a write command of a sequential write stream with the history entry 712b, that is, a "no hit," the write command parameters stored in the queue entry fields 714a-d of the write command of the next entry 712e after the entry 712d of the queue 132, may be checked (block 750) and compared (block 754) to the corresponding write command parameters stored in the queue entry fields 714a-d of the prior history entry which is entry 712b in this example in the manner discussed above. Once the search of the pending write queue 132 for additional hits has been completed without additional hits, the write command at the head of the queue 132 may be write processed, and the head entry indicator moved to the next queue entry 712d and the history indicator moved to the next queue entry 712c, and the sequential write stream detection process of FIG. 7 repeated until all write commands of the pending write command queue have been examined for detection of sequential write streams and write processed.

As previously mentioned, if the number of identified sequential write streams exceeds a maximum number of concurrently active identified sequential write streams, processing of the additional sequential write streams may be suspended for a period of time. Upon completion of the transfer of write data from one of the existing sequential stream transfer buffer partitions, and the release of that storage space, a sequential stream transfer buffer partition may be allocated for the newly identified sequential write stream, and processing of the write data resumed. If upon expiration of the suspension period of time, a sequential stream transfer buffer partition has not been allocated and assigned to the newly identified sequential write stream, processing of the write data for that stream may be resumed and the processed write data buffered in the unallocated transfer buffer partition 530.

In the illustrated embodiment, the sequential write stream write velocity detection logic 310 (FIG. 3) determines the write velocity of a detected sequential write stream as a function of the time difference between write commands of the detected sequential write stream. In one example, the time difference may be determined between the arrival of sequential write commands of a particular detected sequential write stream in the common pending write buffer 132 (FIG. 1). The arrival time difference between sequential write commands of a sequential write stream may be recorded in a data structure such as the detection history data structures 724. In one embodiment, an average of the arrival time differences between sequential write commands of a sequential write stream may be determined to provide a measure of the write velocity of the detected sequential write stream. It is appreciated that other techniques may be used to measure write velocity for a detected sequential write stream, depending upon the particular application.

In one aspect of the present description, the write velocity of a detected sequential write stream may be employed to reduce write amplification, in some instances as low as a write amplification of 1.0, for example. As previously mentioned, in many solid state drives, the nonvolatile storage is typically erased a block of storage at a time. Thus, the entire contents of the erase block, that is, the block being erased, are erased at the same time.

If the host updates all the contents of a block at one time such that all the contents of that block may be erased at one time, write amplification may be reduced as low as 1.0. Conversely, if only some of the contents of a particular block are to be updated and the remaining contents of the block which are not ready to be updated are nonetheless valid, current data, the remaining non-updated, valid current data is relocated by the garbage collection process to preserve the non-updated data before the block can be erased. As a result of the data relocation, the write amplification rises above 1.0.

It is appreciated that even in instances in which the write amplification rises above 1.0 due to data relocation, the data relocation process itself my be facilitated by sequential write stream management in accordance with the present description. For example, where the data to be relocated has been repacked sequentially and in large portions, the efficiency of the data read operations may be improved due to the relocation data being arranged sequentially and in large portions such as multiple 4K blocks per read operation, for example.

In accordance with one aspect of the present description, a detected sequential write stream may be identified by the sequential write stream identification logic 300 as a function of the write velocity measured for the detected sequential write stream by the sequential write stream write velocity detection logic 310. It is appreciated that the write data of detected sequential write streams having the same or similar write velocities tends to be updated at the same or similar times. Hence, the write data for the detected sequential write streams having the same or similar write velocities may be placed in the same storage area or region to facilitate reducing write amplification by reducing garbage collection data relocation.

Thus, for example, if the write velocities for two different detected sequential write streams such as sequential write streams stream-0 and stream-1 (FIG. 4, for example, are measured to be the same or similar (such as within a particular write velocity range, for example), the two different sequential write streams may be identified by the same sequential write stream identification name or number such as stream_ID0, for example. Accordingly, the write data for the two different detected sequential write streams such as streams stream-0 and stream-1 of FIG. 4 may be placed in the same write velocity data aggregation storage region 160a, for example, which has been assigned to the sequential write stream identification, stream_ID0 in this example. As previously mentioned, the write data of sequential streams having the same sequential write stream identification may be reordered and packed contiguously in write data aggregation storage areas such as the areas 400a, 400b of the storage region 160a, based upon the write data destination addressing (such as LBAs, for example) and the submission queue origin information for the detected sequential write streams.

One example in which sequential write stream management may improve solid state drive efficiency is in enterprise systems which are often virtualized to have multiple virtual machines and multiple command submission queues to a solid state drive. It is appreciated herein that even in circumstances in which the queue depth of the various submission queues is relatively low, sequential write performance can be significantly degraded due to mixing of input/output operations from the multiple virtual machines. Such mixing of operations can obfuscate the sequential nature of sequential write streams being provided to the solid state drive.

For example, the enterprise software operating in many enterprise level systems often utilize some form of journaling technique for data loss recovery in the event of an unexpected power failure of the server or other computing device hosting the virtual machines. Such data loss recovery processes for sequential write streams frequently employ a circular buffer technique in which sequential write data to be preserved in written sequentially into the circular buffer until the buffer is filled. Once the buffer is filled to the end of the buffer, the write operations loopback to the beginning of the buffer. As a result, the additional write data to be preserved sequentially overwrites the oldest sequential write data at the beginning of the circular buffer. In this manner, the freshest sequential write data has been preserved in the event of an unexpected power failure. The amount of sequential write data preserved at one time is a function of the size of the circular buffer.

However, due to the intermingling of write commands from the various virtual machines, the write data of the various circular buffers may be intermingled in the solid state storage with each other and with random, nonsequential write data. Hence, the contents of a block of solid state storage may not be updated at the same time, thereby increasing garbage collection data relocation and write amplification. As a consequence, performance of the solid state drive may be degraded.

In accordance with one embodiment of sequential write stream management of the present description, a faster storage response to sequential write streams may be provided while random writes may receive lower performance due to write amplification. In many host applications, the host treats the data recovery journal updates as higher priority write operation which if left unserviced (or serviced at a low bandwidth), the host may block the non-journal write operations as well.

In one aspect of the present description, it is recognized that two different sequential write streams to circular type buffers in storage may be intermingled without significant performance reduction, so long as the rate at which the write streams loopback to over write the older write data in each circular buffer type storage area, is the same. In one embodiment, the write velocity of a sequential stream is the loopback rate at which data is updated in a circular type buffer. As a result, write amplification may be reduced as low 1.0 notwithstanding the intermingling of the write data of the two different sequential write streams having the same or similar write velocities.

For example, a first sequential write stream stream_0 (FIG. 7) may be visualized as in effect a circular buffer having a first size, such as 10 MB, for example. Similarly, a second sequential write stream stream_0 may be visualized as in effect a circular buffer having a second, different size, such as 20 MB, for example. In accordance with the present description, it is recognized that the write data of the two different sequential write streams may be mixed together and placed into the same storage band such as a storage region 160a, for example and maintain a low write amplification such as 1.0, for example, if the loopback rates, that is, the write velocities, of the two sequential write streams are the same.

Accordingly, the two different detected sequential write streams may be identified as a single identified sequential write stream such as stream_ID0, for example, and retain a low write amplification such as 1.0, for example, because the two detected sequential write streams have the same or similar write velocities in the form of the same or similar loopback rates. Because their loopback rates are the same, the storage area 400a for the sequential write streams, stream_0 and stream_1, will be comprised of the mixed write data of the sequential write streams stream_0 and stream_1, mixed in the ratio of 1:2 (10:20 MB) in proportion to their respective sizes or write rates. Accordingly, when the host software issuing the sequential write streams stream_0 and stream_1 loop back around once the storage area 400a has been filled, the garbage collection process will find fully invalidated blocks of storage within the storage area 400a, resulting in a low write amplification for these streams.

To improve the accuracy of the write velocity detection by the sequential write stream write velocity detection logic 310, the driver software of the host software within a processor node 104a-104n for the solid state drive 106, may provide data characterizing the sequential write streams being directed to the solid state drive 106. For example, the solid state drive driver software of a host may provide data identifying the size of each sequential write stream to facilitate the write velocity determination for each detected sequential write stream. The sequential write stream size data and other sequential write stream characterization data may be passed by the driver software to the block storage controller 110 using appropriate write commands, for example. It is appreciated that the sequential write stream characterization data may be passed from the host to the solid state drive 106 using other techniques and formats, depending upon the particular application.

As previously mentioned, to reduce write amplification, in one embodiment, the write data of identified sequential write streams having different write velocities may be written to separate storage bands which may be different transfer buffer partitions, or different storage areas or regions of the nonvolatile storage, for example, as discussed above. It is appreciated that having multiple open bands to accommodate multiple identified sequential write streams may add complexity to data loss recovery techniques for recovering data in the event of an unexpected power failure prior to completion of the write data update. In one embodiment, such data loss recovery may be facilitated by providing a suitable journal to record write data being extracted for the various identified sequential write streams before the write data has been safely aggregated and stored in the assigned storage band for each identified sequential write stream. For example, one known technique for data loss recovery includes use of an "indirection update journal" which records write update data in the event that power is unexpectedly lost prior to completing the update process in storage. Such indirection update journals have typically utilized an additional 1 MB per GB of nonvolatile storage for a suitable indirection update journal.

It is seen from the above that sequential write stream management in one aspect of the present description can order the content of a storage area such as a transfer buffer, for example, to be sequential even though the write commands are not queued or otherwise processed sequentially. In some embodiments, this may result in a re-ordering of data in the non-volatile storage to be in an order that is different from an original Direct Memory Access (DMA) sequence, for example. It is appreciated that such reordering may add complexity to data loss recovery techniques, particularly for larger host data writes such as data writes in a 0.5 KB granularity, for example. As previously mentioned, such data loss recovery may be facilitated by providing a suitable journal to record write data being extracted for the various identified sequential write streams before the write data has been safely aggregated and stored in the assigned storage band for each identified sequential write stream.

It is further appreciated that the sequential write stream detection and write velocity detection may utilize additional processing and memory resources to accommodate the detection operations. However, it is believed that such reductions will be offset by improvements in storage efficiency and reducing or avoiding host level input/output bottlenecks.

Figure 8:
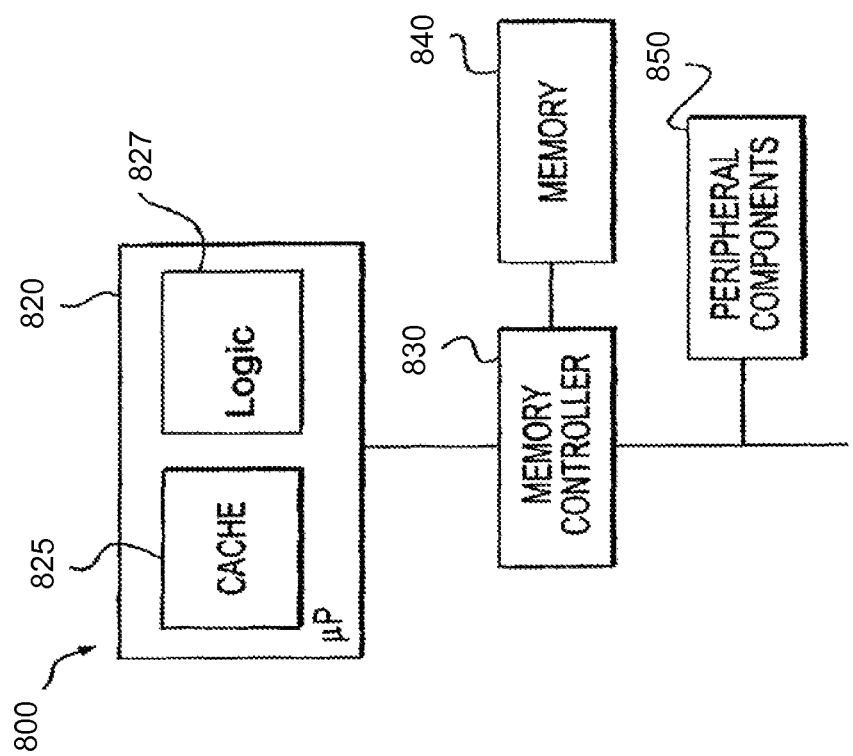
FIG. 8 depicts another example of a computing system, employing sequential write stream management in accordance with an embodiment of the present disclosure.

FIG. 8 is a high-level block diagram illustrating selected aspects of another example of a computing system 800 employing sequential write stream management in accordance with the present description. System 800 may represent any of a number of electronic and/or computing devices, that may include a memory or storage device. Such electronic and/or computing devices may include computing devices such as a mainframe, server, personal computer, workstation, telephony device, network appliance, virtualization device, storage controller, portable or mobile devices (e.g., laptops, netbooks, tablet computers, personal digital assistant (PDAs), portable media players, portable gaming devices, digital cameras, mobile phones, smartphones, feature phones, etc.) or component (e.g. system on a chip, processor, bridge, block storage controller, storage, etc.). In alternative embodiments, system 800 may include more elements, fewer elements, and/or different elements. Moreover, although system 800 may be depicted as comprising separate elements, it will be appreciated that such elements may be integrated on to one platform, such as systems on a chip (SoCs). In the illustrative example, system 800 comprises a microprocessor 820, a block storage controller 830, a memory or storage 840 and peripheral components 850 which may include, for example, video controller, input device, output device, storage, network adapter, etc. The microprocessor 820 includes processing logic 827 and a cache 825 that may be part of a memory hierarchy to store instructions and data, and the system memory or storage 840 may also be part of the memory or storage hierarchy. Communication between the microprocessor 820 and the memory or storage 840 may be facilitated by the block storage controller (or chipset) 830, which may also facilitate in communicating with the peripheral components 850.

Storage of the peripheral components 850 may be, for example, non-volatile storage, such as solid-state drives, magnetic disk drives, optical disk drives, a tape drive, flash memory, etc.). The storage may comprise an internal storage device or an attached or network accessible storage. The microprocessor 820 is configured to write data in and read data from the memory or storage 840. Programs in the storage are loaded into the memory and executed by the processor. A network controller or adapter enables communication with a network, such as an Ethernet, a Fiber Channel Arbitrated Loop, etc. Further, the architecture may, in certain embodiments, include a video controller configured to render information on a display monitor, where the video controller may be embodied on a video card or integrated on integrated circuit components mounted on a motherboard or other substrate. An input device is used to provide user input to the processor, and may include a keyboard, mouse, pen-stylus, microphone, touch sensitive display screen, input pins, sockets, or any other activation or input mechanism known in the art. An output device is capable of rendering information transmitted from the processor, or other component, such as a display monitor, printer, storage, output pins, sockets, etc. The network adapter may embodied on a network card, such as a Peripheral Component Interconnect (PCI) card, PCI-express, or some other I/O card, or on integrated circuit components mounted on a motherboard or other substrate.

One or more of the components of the device 800 may be omitted, depending upon the particular application. For example, a network router may lack a video controller, for example. Any one or more of the memory devices 825, 840, and the other devices 800, 830, 850 may include sequential write stream management in accordance with the present description.

EXAMPLES

The following examples pertain to further embodiments.

Example 1 is an apparatus for use with a plurality of command submission queues of a plurality of processor nodes, comprising:

a solid-state storage drive including nonvolatile storage having a plurality of regions of storage space, and a storage controller having a common command queue, said controller configured to:

queue a plurality of write commands from the plurality of command submission queues in the common command queue; and execute write commands queued in the common command queue;

wherein the controller has sequential write stream identification logic which includes sequential write stream detection logic configured to detect first and second sequential write streams in the write commands, wherein the sequential write stream identification logic is configured to identify the detected first and second sequential write streams as first and second identified sequential write streams, respectively, as a function of characteristics of the first and second detected sequential write streams, and wherein the controller further has sequential write stream aggregation logic configured to write write data of commands being executed into different sequential write stream regions of the solid-state storage as a function of the write stream identifying, including aggregating write data of the first identified sequential write stream in a first sequential write stream storage region of the solid-state storage, and aggregating write data of the second identified sequential write stream in a second sequential write stream storage region of the solid-state storage.

In Example 2, the subject matter of Examples 1-7 (excluding the present example) can optionally include wherein the solid state storage drive further includes transfer buffer storage having sequential write stream buffer partitions, and the controller further has transfer buffer partition write stream data aggregation logic configured to write write data of commands being executed into different sequential write stream buffer partitions of the transfer buffer storage as a function of the write stream identifying by the sequential write stream identification logic, including aggregating write data of the first identified sequential write stream in a first sequential write stream buffer partition of the transfer buffer storage, and aggregating write data of the second identified sequential write stream in a second sequential write stream buffer partition of the transfer buffer storage.

In Example 3, the subject matter of Examples 1-7 (excluding the present example) can optionally include wherein the sequential write stream detection logic is further configured to detect a third sequential write stream in the write command, and the sequential write stream identification logic is further configured to identify the detected third sequential write stream as the first identified sequential write streams as a function of characteristics of the first and third detected sequential write streams, and the storage controller is further configured so that the writing write data of commands being executed into different regions of the solid-state storage as a function of the write stream identifying, includes aggregating write data of the third detected sequential write stream in the first region area of the solid-state storage.

In Example 4, the subject matter of Examples 1-7 (excluding the present example) can optionally include wherein the sequential write stream identification logic which further includes sequential write stream write velocity detection logic configured to determine a write velocity characteristic for each detected sequential write stream, and the sequential write stream identification logic is further configured so that the identifying the detected first and third sequential write streams as the first identified sequential write stream and the identifying the detected second sequential write streams as the second identified sequential write stream is a function of the detected first and third sequential write streams having detected write velocity characteristics in a first range, and the detected second sequential write stream having detected write velocity characteristics in a second range.

In Example 5, the subject matter of Examples 1-7 (excluding the present example) can optionally include wherein the sequential write stream detection logic is further configured so that the detecting first and second sequential write streams in the write commands includes checking parameters of the write commands in the common command queue and wherein the parameters include a write data destination parameter, and determining if the write data destination parameters of two write commands match those of two write commands in a sequence of write commands for a sequential write stream.

In Example 6, the subject matter of Examples 1-7 (excluding the present example) can optionally include wherein the parameters include a command submission queue origin parameter for each write command of the common command queue.

In Example 7, the subject matter of Examples 1-7 (excluding the present example) can optionally include wherein the sequential write stream aggregation logic is further configured so that the aggregating the write data of the first identified sequential write stream in the first region of the solid state storage includes sequentially reordering and packing write data of the first identified sequential write stream contiguously within the first region as a function of characteristics of the first identified sequential write stream including a write destination address characteristic of the first sequential write stream.

Example 8 is a system for use with a display, comprising:
a plurality of processor nodes having a plurality of command submission queues;
a solid-state storage drive including nonvolatile storage having a plurality of regions of storage space, and a storage controller having a common command queue; and
a video controller for displaying data representative of data stored in the storage;
wherein the storage controller is configured to:
queue a plurality of write commands from the plurality of command submission queues in the common command queue; and
execute write commands queued in the common command queue;
wherein the storage controller has sequential write stream identification logic which includes sequential write stream detection logic configured to detect first and second sequential write streams in the write commands, wherein the sequential write stream identification logic is configured to identify the detected first and second sequential write streams as first and second identified sequential write streams, respectively, as a function of characteristics of the first and second detected sequential write streams, and wherein the storage controller further has sequential write stream aggregation logic configured to write write data of commands being executed into different sequential write stream regions of the solid-state storage as a function of the write stream identifying, including aggregating write data of the first identified sequential write stream in a first sequential write stream storage region of the solid-state storage, and aggregating write data of the second identified sequential write stream in a second sequential write stream storage region of the solid-state storage.

In Example 9, the subject matter of Examples 8-14 (excluding the present example) can optionally include wherein the solid state storage drive further includes transfer buffer storage having sequential write stream buffer partitions, and the storage controller further has transfer buffer partition write stream data aggregation logic configured to write write data of commands being executed into different sequential write stream buffer partitions of the transfer buffer storage as a function of the write stream identifying by the sequential write stream identification logic, including aggregating write data of the first identified sequential write stream in a first sequential write stream buffer partition of the transfer buffer storage, and aggregating write data of the second identified sequential write stream in a second sequential write stream buffer partition of the transfer buffer storage.

In Example 10, the subject matter of Examples 8-14 (excluding the present example) can optionally include wherein the sequential write stream detection logic is further configured to detect a third sequential write stream in the write command, and the sequential write stream identification logic is further configured to identify the detected third sequential write stream as the first identified sequential write streams as a function of characteristics of the first and third detected sequential write streams, and the memory storage controller is further configured so that the writing write data of commands being executed into different regions of the solid-state storage as a function of the write stream identifying, includes aggregating write data of the third detected sequential write stream in the first region area of the solid-state storage.

In Example 11, the subject matter of Examples 8-14 (excluding the present example) can optionally include wherein the sequential write stream identification logic which further includes sequential write stream write velocity detection logic configured to determine a write velocity characteristic for each detected sequential write stream, and the sequential write stream identification logic is further configured so that the identifying the detected first and third sequential write streams as the first identified sequential write stream and the identifying the detected second sequential write streams as the second identified sequential write stream is a function of the detected first and third sequential write streams having detected write velocity characteristics in a first range, and the detected second sequential write stream having detected write velocity characteristics in a second range.

In Example 12, the subject matter of Examples 8-14 (excluding the present example) can optionally include wherein the sequential write stream detection logic is further configured so that the detecting first and second sequential write streams in the write commands includes checking parameters of the write commands in the common command queue and wherein the parameters include a write data destination parameter, and determining if the write data destination parameters of two write commands match those of two write commands in a sequence of write commands for a sequential write stream.

In Example 13, the subject matter of Examples 8-14 (excluding the present example) can optionally include wherein the parameters include a command submission queue origin parameter for each write command of the common command queue.

In Example 14, the subject matter of Examples 8-14 (excluding the present example) can optionally include wherein the sequential write stream aggregation logic is further configured so that the aggregating the write data of the first identified sequential write stream in the first region of the solid state storage includes sequentially reordering and packing write data of the first identified sequential write stream contiguously within the first region as a function of characteristics of the first identified sequential write stream including a write destination address characteristic of the first sequential write stream.

Example 15 is a method, comprising:
queuing a plurality of write commands from a plurality of command submission queues in a common command queue;

executing write commands queued in the common command queue;

detecting first and second sequential write streams in the write commands;

identifying the detected first and second sequential write streams as first and second identified sequential write streams, respectively, as a function of characteristics of the first and second detected sequential write streams, and writing write data of commands being executed into different sequential write stream regions of a solid-state storage as a function of the write stream identifying, said write data writing including:

aggregating write data of the first identified sequential write stream in a first sequential write stream storage region of the solid-state storage; and aggregating write data of the second identified sequential write stream in a second sequential write stream storage region of the solid-state storage.

In Example 16, the subject matter of Examples 15-21 (excluding the present example) can optionally include further comprising writing write data of commands being executed into different sequential write stream buffer partitions of a transfer buffer storage as a function of the write stream identifying, said transfer buffer storage write data writing including:

aggregating write data of the first identified sequential write stream in a first sequential write stream buffer partition of the transfer buffer storage; and aggregating write data of the second identified sequential write stream in a second sequential write stream buffer partition of the transfer buffer storage.

In Example 17, the subject matter of Examples 15-21 (excluding the present example) can optionally include:

detecting a third sequential write stream in the write commands;

identifying the detected third sequential write stream as the first identified sequential write streams as a function of characteristics of the first and third detected sequential write streams;

wherein the writing write data of commands being executed into different regions of a solid-state storage as a function of the write stream identifying further includes:

aggregating write data of the third detected sequential write stream in the first region area of the solid-state storage.

In Example 18, the subject matter of Examples 15-21 (excluding the present example) can optionally include:

determining a write velocity characteristic for each detected sequential write stream;

wherein the identifying the detected first and third sequential write streams as the first identified sequential write stream and the identifying the detected second sequential write streams as the second identified sequential write stream is a function of the detected first and third sequential write streams having detected write velocity characteristics in a first range, and the detected second sequential write stream having detected write velocity characteristics in a second range.

In Example 19, the subject matter of Examples 15-21 (excluding the present example) can optionally include wherein the detecting first and second sequential write streams in the write commands includes checking parameters of the write commands in the common command queue and wherein the parameters include a write data destination parameter, and determining if the write data destination parameters of two write commands match those of two write commands in a sequence of write commands for a sequential write stream.

In Example 20, the subject matter of Examples 15-21 (excluding the present example) can optionally include wherein the parameters include a command submission queue origin parameter for each write command of the common command queue.

In Example 21, the subject matter of Examples 15-21 (excluding the present example) can optionally include wherein the aggregating the write data of the first identified sequential write stream in the first region of the solid state storage includes sequentially reordering and packing write data of the first identified sequential write stream contiguously within the first region as a function of characteristics of the first identified sequential write stream including a write destination address characteristic of the first sequential write stream.

In Example 22, the subject mater of Examples 1-7 can optionally include a system for use with a display, wherein the system comprises:

a plurality of processor nodes having said plurality of command submission queues;

said solid-state storage drive; and a video controller for displaying data representative of data stored in the storage.

Example 23 is an apparatus comprising means to perform a method as claimed in any preceding example.

The described operations may be implemented as a method, apparatus or computer program product using standard programming and/or engineering techniques to produce software, firmware, hardware, or any combination thereof. The described operations may be implemented as computer program code maintained in a "computer readable storage medium", where a processor may read and execute the code from the computer storage readable medium. The computer readable storage medium includes at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), etc. The code implementing the described operations may further be implemented in hardware logic implemented in a hardware device (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium is not comprised solely of transmissions signals. Those skilled in the art will recognize that many modifications may be made to this configuration without departing from the scope of the present description, and that the article of manufacture may comprise suitable information bearing medium known in the art. Of course, those skilled in the art will recognize that many modifications may be made to this configuration without departing from the scope of the present description, and that the article of manufacture may comprise any tangible information bearing medium known in the art.

In certain applications, a device in accordance with the present description, may be embodied in a computer system including a video controller to render information to display on a monitor or other display coupled to the computer system, a device driver and a network controller, such as a computer system comprising a desktop, workstation, server, mainframe, laptop, handheld computer, etc. Alternatively, the device embodiments may be embodied in a computing device that does not include, for example, a video controller, such as a switch, router, etc., or does not include a network controller, for example.

The illustrated logic of figures may show certain events occurring in a certain order. In alternative embodiments, certain operations may be performed in a different order, modified or removed. Moreover, operations may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and description. It is not intended to be exhaustive or to limit to the precise form disclosed. Many modifications and variations are possible in light of the above teaching.

What is claimed is:

1. An apparatus for use with a plurality of command submission queues of a plurality of processor nodes, comprising:
    a solid-state storage drive including nonvolatile storage having a plurality of regions of storage space, and a storage controller having a common command queue, said controller configured to:
        queue a plurality of write commands from the plurality of command submission queues in the common command queue; and
        execute write commands queued in the common command queue;
        wherein the controller has sequential write stream identification logic which includes sequential write stream detection logic configured to detect first and second sequential write streams in the write commands, wherein the sequential write stream identification logic is configured to identify the detected first and second sequential write streams as first and second identified sequential write streams, respectively, as a function of characteristics of the first and second detected sequential write streams including a write velocity characteristic, and wherein the controller further has sequential write stream aggregation logic configured to write write data of commands being executed into different sequential write stream regions of the solid-state storage as a function of the write stream identifying, including aggregating write data of the first identified sequential write stream in a first sequential write stream storage region of the solid-state storage, and aggregating write data of the second identified sequential write stream in a second sequential write stream storage region of the solid-state storage.

2. The apparatus of claim 1 wherein the solid state storage drive further includes transfer buffer storage having sequential write stream buffer partitions, and the controller further has transfer buffer partition write stream data aggregation logic configured to write write data of commands being executed into different sequential write stream buffer partitions of the transfer buffer storage as a function of the write stream identifying by the sequential write stream identification logic, including aggregating write data of the first identified sequential write stream in a first sequential write stream buffer partition of the transfer buffer storage, and aggregating write data of the second identified sequential write stream in a second sequential write stream buffer partition of the transfer buffer storage.

3. The apparatus of claim 1 wherein the sequential write stream detection logic is further configured to detect a third sequential write stream in the write command, and the sequential write stream identification logic is further configured to identify the detected third sequential write stream as the first identified sequential write streams as a function of characteristics of the first and third detected sequential write streams, and the storage controller is further configured so that the writing write data of commands being executed into different regions of the solid-state storage as a function of the write stream identifying, includes aggregating write data of the third detected sequential write stream in the first region of the solid-state storage.

4. The apparatus of claim 3 wherein the sequential write stream identification logic which further includes sequential write stream write velocity detection logic configured to determine a write velocity characteristic for each detected sequential write stream, and the sequential write stream identification logic is further configured so that the identifying the detected first and third sequential write streams as the first identified sequential write stream and the identifying the detected second sequential write streams as the second identified sequential write stream is a function of the detected first and third sequential write streams having detected write velocity characteristics in a first range, and the detected second sequential write stream having detected write velocity characteristics in a second range.

5. The apparatus of claim 1 wherein the sequential write stream detection logic is further configured so that the detecting first and second sequential write streams in the write commands includes checking parameters of the write commands in the common command queue and wherein the parameters include a write data destination parameter, and determining if the write data destination parameters of two write commands match those of two write commands in a sequence of write commands for a sequential write stream.

6. The apparatus of claim 5 wherein the parameters include a command submission queue origin parameter for each write command of the common command queue.

7. The apparatus of claim 3 wherein the sequential write stream aggregation logic is further configured so that the aggregating the write data of the first identified sequential write stream in the first region of the solid state storage includes sequentially reordering and packing write data of the first identified sequential write stream contiguously within the first region as a function of characteristics of the first identified sequential write stream including a write destination address characteristic of the first sequential write stream.

8. A system for use with a display, comprising:
    a plurality of processor nodes having a plurality of command submission queues;
    a solid-state storage drive including nonvolatile storage having a plurality of regions of storage space, and a storage controller having a common command queue; and
    a video controller for displaying data representative of data stored in the storage;

wherein the storage controller is configured to:
queue a plurality of write commands from the plurality of command submission queues in the common command queue; and
execute write commands queued in the common command queue;
wherein the storage controller has sequential write stream identification logic which includes sequential write stream detection logic configured to detect first and second sequential write streams in the write commands, wherein the sequential write stream identification logic is configured to identify the detected first and second sequential write streams as first and second identified sequential write streams, respectively, as a function of characteristics of the first and second detected sequential write streams including a write velocity characteristic, and wherein the storage controller further has sequential write stream aggregation logic configured to write write data of commands being executed into different sequential write stream regions of the solid-state storage as a function of the write stream identifying, including aggregating write data of the first identified sequential write stream in a first sequential write stream storage region of the solid-state storage, and aggregating write data of the second identified sequential write stream in a second sequential write stream storage region of the solid-state storage.

9. The system of claim 8 wherein the solid state storage drive further includes transfer buffer storage having sequential write stream buffer partitions, and the storage controller further has transfer buffer partition write stream data aggregation logic configured to write write data of commands being executed into different sequential write stream buffer partitions of the transfer buffer storage as a function of the write stream identifying by the sequential write stream identification logic, including aggregating write data of the first identified sequential write stream in a first sequential write stream buffer partition of the transfer buffer storage, and aggregating write data of the second identified sequential write stream in a second sequential write stream buffer partition of the transfer buffer storage.

10. The system of claim 8 wherein the sequential write stream detection logic is further configured to detect a third sequential write stream in the write command, and the sequential write stream identification logic is further configured to identify the detected third sequential write stream as the first identified sequential write streams as a function of characteristics of the first and third detected sequential write streams, and the storage controller is further configured so that the writing write data of commands being executed into different regions of the solid-state storage as a function of the write stream identifying, includes aggregating write data of the third detected sequential write stream in the first region of the solid-state storage.

11. The system of claim 10 wherein the sequential write stream identification logic which further includes sequential write stream write velocity detection logic configured to determine a write velocity characteristic for each detected sequential write stream, and the sequential write stream identification logic is further configured so that the identifying the detected first and third sequential write streams as the first identified sequential write stream and the identifying the detected second sequential write streams as the second identified sequential write stream is a function of the detected first and third sequential write streams having detected write velocity characteristics in a first range, and the detected second sequential write stream having detected write velocity characteristics in a second range.

12. The system of claim 8 wherein the sequential write stream detection logic is further configured so that the detecting first and second sequential write streams in the write commands includes checking parameters of the write commands in the common command queue and wherein the parameters include a write data destination parameter, and determining if the write data destination parameters of two write commands match those of two write commands in a sequence of write commands for a sequential write stream.

13. The system of claim 12 wherein the parameters include a command submission queue origin parameter for each write command of the common command queue.

14. The system of claim 10 wherein the sequential write stream aggregation logic is further configured so that the aggregating the write data of the first identified sequential write stream in the first region of the solid state storage includes sequentially reordering and packing write data of the first identified sequential write stream contiguously within the first region as a function of characteristics of the first identified sequential write stream including a write destination address characteristic of the first sequential write stream.

15. A method, comprising:
queuing a plurality of write commands from a plurality of command submission queues in a common command queue;
executing write commands queued in the common command queue;
detecting first and second sequential write streams in the write commands;
identifying the detected first and second sequential write streams as first and second identified sequential write streams, respectively, as a function of characteristics of the first and second detected sequential write streams including a write velocity characteristic, and
writing write data of commands being executed into different sequential write stream regions of a solid-state storage as a function of the write stream identifying, said write data writing including:
aggregating write data of the first identified sequential write stream in a first sequential write stream storage region of the solid-state storage; and
aggregating write data of the second identified sequential write stream in a second sequential write stream storage region of the solid-state storage.

16. The method of claim 15 further comprising writing write data of commands being executed into different sequential write stream buffer partitions of a transfer buffer storage as a function of the write stream identifying, said transfer buffer storage write data writing including:
aggregating write data of the first identified sequential write stream in a first sequential write stream buffer partition of the transfer buffer storage; and
aggregating write data of the second identified sequential write stream in a second sequential write stream buffer partition of the transfer buffer storage.

17. The method of claim 15 further comprising:
detecting a third sequential write stream in the write commands;
identifying the detected third sequential write stream as the first identified sequential write streams as a function of characteristics of the first and third detected sequential write streams;

wherein the writing write data of commands being executed into different regions of a solid-state storage as a function of the write stream identifying further includes:

aggregating write data of the third detected sequential write stream in the first region of the solid-state storage.

18. The method of claim 17 further comprising:

determining a write velocity characteristic for each detected sequential write stream;

wherein the identifying the detected first and third sequential write streams as the first identified sequential write stream and the identifying the detected second sequential write streams as the second identified sequential write stream is a function of the detected first and third sequential write streams having detected write velocity characteristics in a first range, and the detected second sequential write stream having detected write velocity characteristics in a second range.

19. The method of claim 15 wherein the detecting first and second sequential write streams in the write commands includes checking parameters of the write commands in the common command queue and wherein the parameters include a write data destination parameter, and determining if the write data destination parameters of two write commands match those of two write commands in a sequence of write commands for a sequential write stream.

20. The method of claim 19 wherein the parameters include a command submission queue origin parameter for each write command of the common command queue.

21. The method of claim 17 wherein the aggregating the write data of the first identified sequential write stream in the first region of the solid state storage includes sequentially reordering and packing write data of the first identified sequential write stream contiguously within the first region as a function of characteristics of the first identified sequential write stream including a write destination address characteristic of the first sequential write stream.

* * * * *